G. N. RILEY.

TUBE COUPLING.

No. 10,994. Reissued Apr. 16, 1889.

Witnesses:

J. N. Cooke

Robt. D. Totten

Inventor.

George N. Riley

By James J. Kay

Attorney

THE NORRIS PETERS CO., PHOTO-LITHO., WASHINGTON, D. C.

UNITED STATES PATENT OFFICE.

GEORGE N. RILEY, OF BRADDOCK, PENNSYLVANIA.

TUBE-COUPLING.

SPECIFICATION forming part of Reissued Letters Patent No. 10,994, dated April 16, 1889.

Original No. 374,557, dated December 6, 1887. Application for reissue filed March 21, 1889. Serial No. 304,069.

*To all whom it may concern:*

Be it known that I, GEORGE N. RILEY, of Braddock, in the county of Allegheny and State of Pennsylvania, have invented a new and useful Improvement in Tube-Couplings; and I do hereby declare the following to be a full, clear, and exact description thereof.

My invention relates to the couplings for tubing, its object being to provide a simple and efficient tube-joint in which the tubing is held within the coupling against longitudinal strain by lead or other calking material within the coupling-sleeve, the invention being an improvement on Letters Patent granted to Edmund C. Converse August 28, 1883, No. 283,974. In said Letters Patent is described a coupling-sleeve having an inner face or faces, within which the ends of the tubing fit, and beyond the same calking-recesses having inwardly-flaring sides, and the tubing is provided with lugs or projections near the ends thereof, the tubing being held within the coupling by means of lead or other suitable calking material, against which the lugs on the tubing press, while the calking material is held within the calking-recess by the inwardly-flaring sides thereof. In this coupling the only hold of the tubing was by the pressure of the lugs against the lead, and as the lugs had only a small surface-bearing thereon it is evident that there was not a very strong hold against such longitudinal strain, and the purpose of my invention is to provide a greater surface-bearing upon the lead within the calking-recesses, and therefore a greater hold of the lead upon the tubing to sustain the longitudinal strain thereof. This I obtain by employing, in connection with the lugs on the tubing, a loose ring fitting around the tubing and against the lugs, this loose ring giving a bearing on the calking material around the entire circumference of the pipe, so that the longitudinal strain is distributed from the lugs to the loose ring fitting against the same, and thence to the lead held within the inwardly-flaring calking-recess.

To enable others skilled in the art to employ my invention, I will describe the same more fully, referring to the accompanying drawings, in which—

Figure 1:
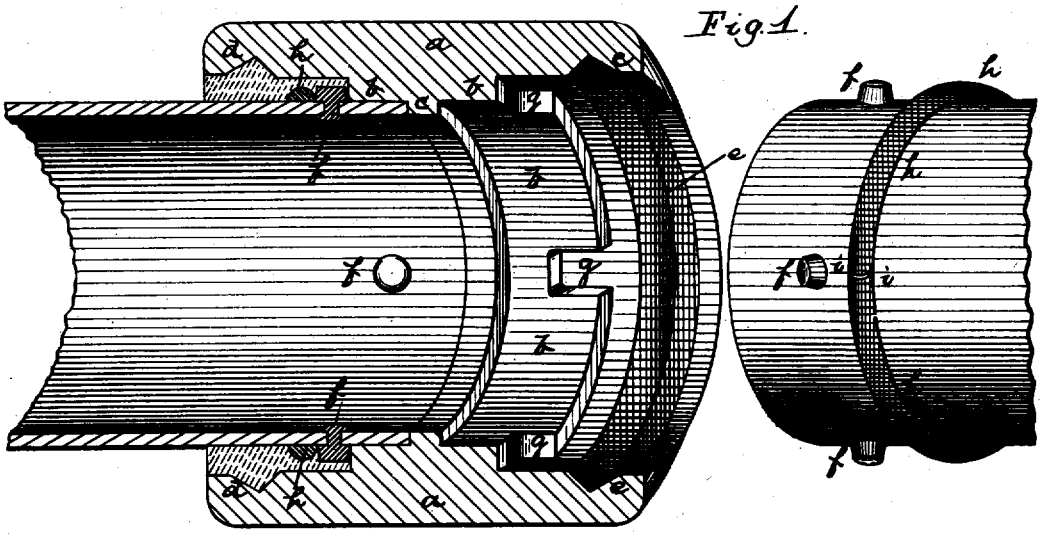
Figure 3:
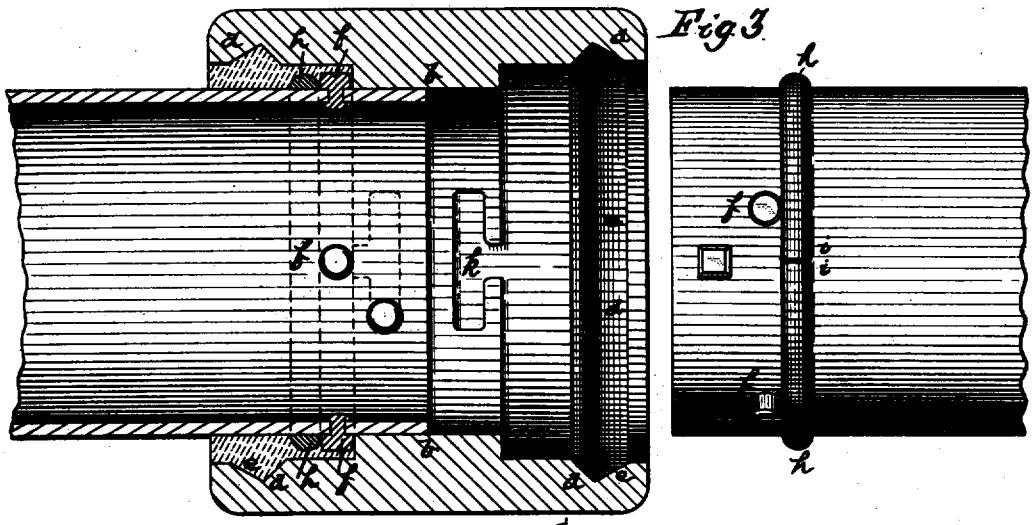
Figure 2:
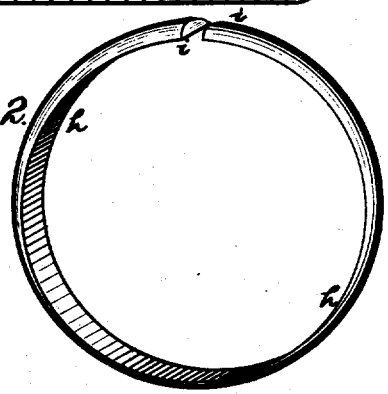

Figure 1 is a perspective sectional view of a coupling, showing one tube-section connected within the coupling sleeve or collar and the other about to enter the same. Fig. 2 is a view of the ring employed with the tubing. Fig. 3 is a sectional view of the coupling, showing my invention employed with a Converse joint, such as shown in Letters Patent No. 283,971.

Like letters of reference indicate like parts in each.

The coupling sleeve or collar *a* may be either formed of wrought or cast metal, being preferably formed of wrought metal when it is employed in joints for gas-mains, as the gas under a high pressure is liable to pass through the pores of the cast metal, which is prevented by the close texture of the wrought metal.

The coupling is provided with the inner face or faces, *b*, having either the central ring, *c*, against which the ends of the tubing butt or bear, and an inner face, *b*, on each side thereof, as in Fig. 1, or the central inner face, *b*, within which the ends of the tubing meet, as in Fig. 3. At the ends of the sleeve or collar are the calking-recesses *d*, these calking-recesses being formed inwardly flaring, as at *e*, so as to hold the lead within the calking-recesses and enable it to hold the tube-sections within the collar, as hereinafter described. The tubing employed is what is generally known as "light-wrought metal" tubing, this class of tubing being made lighter than the ordinary threaded tubing, as it is not weakened by cutting the threads therein, the tubing having near the ends thereof the lugs or rivets *f*, which preferably enter sockets *g*, formed at the ends of the inner face or faces, *b*, of the collar *a*, so preventing the tubing from turning within the socket. Fitting loosely around the tube-section beyond these lugs is the ring *h*, this ring being formed of wrought-iron or steel, bent to shape with its ends *i* free, so that it can be sprung open to pass beyond the lugs *f* on the tubing, and in forming the joint the tube-section is entered within the collar or sleeve until the lugs *f* fit within the calking-recesses against the ends of the inner face or faces, and the rings *h* are then slipped along the tube-sections until they fit against the lugs

*f*. The lead or other suitable material is then poured within the calking-recesses, and when set or cooled is calked by suitable tools. The lead passes around the rings *h*, and between them and the ends of the collar, so holding the tube-sections within the collar, and in case of any longitudinal strain upon the tubing that strain is distributed from the lugs *f* thereon to the ring fitting around the tubing, and from the ring to the lead within the calking-recess, and as the lead is confined within the inwardly-flaring portion of the calking-recess the strain upon the ring acts by its pressure upon the lead to compact the lead within the calking-recess, and as the lead is confined therein it holds the tubing within the collar so as to sustain the tubing against such longitudinal strain.

The rings *h* have their faces formed curved or tapering corresponding to the depression or inwardly-flaring portions of the calking-recesses, so that there is no liability of the rings cutting the lead, their action being simply to cause the compression of the lead between their outer faces and the calking-recesses and to enable the lead to hold the tube-sections within the collar. These devices may be employed, as shown in Fig. 3, in connection with the Converse joint, having locking-recesses within the collar—such as shown in the Patent No. 283,971—and similar joints, the coupling collars or sleeves having the locking-recesses *k*, and the tubing having lugs or other connecting devices engaging therewith so as to lock the tubing within the collar, and the tubing having a series of lugs, *f*, back of said connecting devices, and the rings *h* fitting against these lugs, so that when the joint is made and the lead secured within the calking-recesses the tube-sections are held within the collar not only by the locking devices, as above referred to, but by the compression of the lead by means of the rings pressing against the lead, as above set forth.

My improved joint made in this manner may be employed with any suitable form of joint or coupling, as well as with any form of coupling having a locking-connection between the tubing and the coupling-collar, and will act in connection therewith to greatly increase the hold of the collar upon the tube-sections, and so aid the collar in holding the tubing against longitudinal strain. By the employment of the loose rings fitting around the tube-sections the pressure from the lugs is distributed over the entire surface of the lead within the calking-recesses, and consequently a much stronger connection between the coupling-collar and the tube-sections is obtained than if the only hold between the collar and the tube-sections was by means of the lugs themselves. These lugs can be secured to the tube-sections at a very small cost, and the joint can therefore be made much cheaper than if the continuous collar were welded or shrunken upon the tubing, as shown in Letters Patent No. 283,972, granted to said Converse August 28, 1883. At the same time, where it is found necessary to deflect the pipe, as is often the case, the lugs and the loose ring act to hold the tubing within the collar, even though such deflection is made.

I am aware that a spring-packing ring has been used in connection with pipe-joints.

What I claim as my invention, and desire to secure by Letters Patent, is—

1. The combination, with a collar provided with an annular inwardly-flaring calking-recess at the end thereof, of a section of tubing having lugs thereon and a loose ring fitting against said lugs and within the calking-recess, substantially as and for the purposes set forth.

2. In tube-couplings, the combination, with a collar provided with annular inwardly-flaring calking-recesses at the ends, of the tubing having lugs thereon and a loose ring fitting against said lugs and within the calking-recesses, substantially as and for the purposes set forth.

3. In tube-couplings, the combination, with a coupling-collar having annular inwardly-flaring calking-recesses at the ends, of the tubing having lugs thereon and a loose ring fitting against the lugs and within the calking-recesses, said loose ring having a curved or beveled face corresponding in shape to the inwardly-flaring calking-recesses, substantially as and for the purposes set forth.

4. In tube-couplings, the combination, with a coupling-collar having annular inwardly-flaring calking-recesses at the ends and tube-sections adapted to engage therewith by suitable locking devices, of lugs on the tubing and loose rings fitting against said lugs within the calking-recesses, substantially as and for the purposes set forth.

In testimony whereof I, the said GEORGE N. RILEY, have hereunto set my hand.

GEORGE N. RILEY.

Witnesses:
JAMES I. HAY,
J. N. COOKE.